April 18, 1944. C. A. STEVENS 2,347,138
HARVESTER
Filed Nov. 16, 1942

INVENTOR.
Clarence A. Stevens
BY

Patented Apr. 18, 1944

2,347,138

UNITED STATES PATENT OFFICE 2,347,138

HARVESTER

Clarence A. Stevens, Wichita, Kans.

Application November 16, 1942, Serial No. 465,667

12 Claims. (Cl. 56—123)

This invention pertains to improvements of the crop gathering mechanism in harvesting machines; particularly, harvesters which travel over the field collect, process and deliver the crop in marketable condition.

My object is to provide adequate mechanism to transport the crop in a positive uniform flow from the fields to the thresher unit of the harvester and to avoid certain wastes now prevalent in conventional harvesters.

Many conventional harvesters employ a reel to cause the crop to contact the sickle for severing and to deliver the crop into a harvester grain pan behind the cutter. A spiral conveyor with shaft parallel to the reel shaft and with the sickle is employed to transport the crop from the sickle toward the thresher, arranged at a point behind the spiral conveyor. The thresher removes the grain from the heads and delivers the crop to separating and cleaning means for separating the grain from the waste.

With means usually employed, various troubles are encountered. The reel in unfavorable conditions delivers much of the crop on the top of the spiral conveyor instead of to the under section. The crop must be in the under section of the conveyor to be transported by the conveyor in a positive uniform flow toward the thresher. Material on top of the spiral conveyor is not evenly carried toward the thresher and much of the crop is thrown over the back of the harvester unit or carried around the reel and does not enter the thresher.

In conventional harvesters, having a spiral conveyor to transport the crop to the thresher from the sickle, much trouble is caused by long tough straw, weeds and other waste material following around and wrapping about the spiral conveyor. Large bunches of straw accumulated by wrapping about the spiral conveyor often cause the thresher cylinder to slow down and sometimes to stop. This causes loss of power, loss of time, and loss of grain.

In conventional harvesters having spiral conveyors to transport the cut crop from the sickle towards the thresher, it is customary to employ a variety of devices, fixed on the spiral conveyor to facilitate the delivery of the crop from the conveyor to the thresher. The spiral conveyors of conventional harvesters are provided with a hood over the conveyor and in front of the thresher. This hood is usually termed "the feeder housing" and serves to prevent flying grains escaping from the front of the thresher. In such harvesters, the spiral conveyor is as long as the hood plus the length of the sickle. The sickle does not cut in front of the hood or feeder housing.

In harvesters having a spiral conveyor, arranged to convey the crop from the ends of the harvester's grain pan and towards its transverse center and back toward a thresher, there is some loss of loose grain from the thresher, the flying grain escaping through the top section of the spiral conveyor.

Drawing illustrating this invention accompanies this specification:

The same number is used to indicate the same part in each figure.

Figure 1:
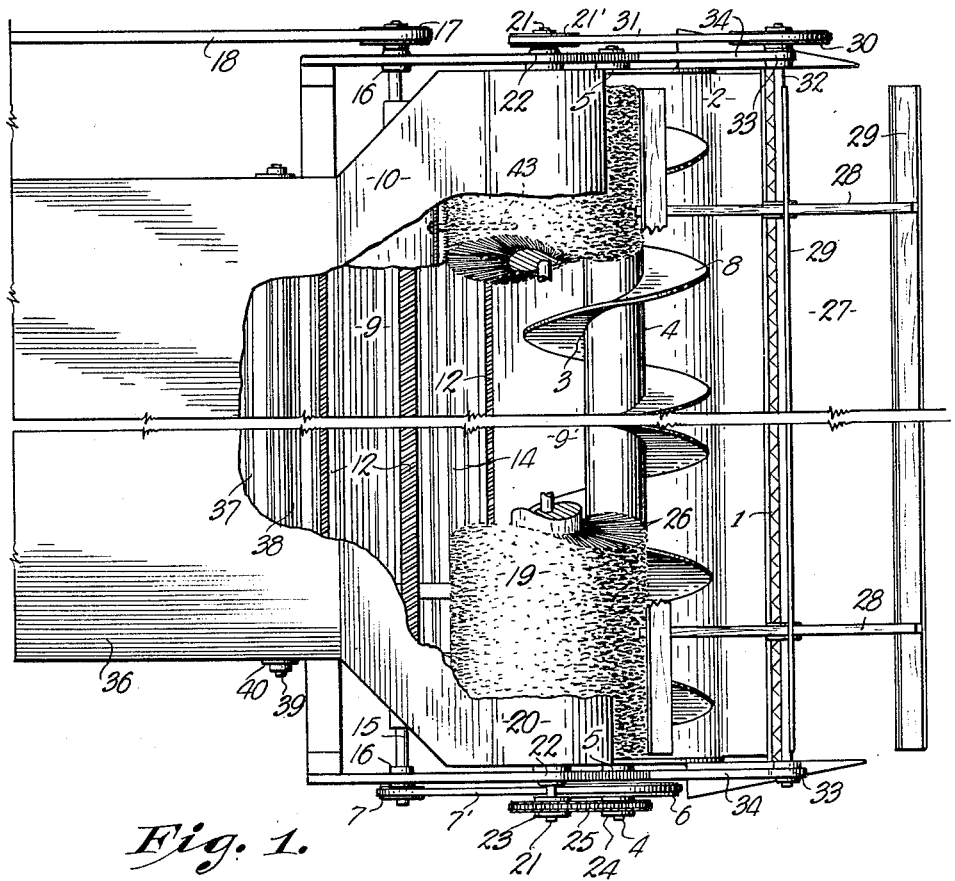
Figure 1 is a plan view of the harvester unit.

To secure a positive uniform flow of the crop from the field to the thresher, I have provided a rotatable cylindrical brush 19 substantially as long and nearly the same diameter as the spiral conveyor 3. The brush 19 and the spiral conveyor 3 operate in intermeshing relation. A sickle 1 and a reel 27 each as long as the brush, operate in harmonius relation with the conveyor 3 and the brush 19 to deliver the crop in an even flow from the field to the thresher 9. The brush 19 in combination with the spiral conveyor 3 delivers the crop toward a threshing cylinder 9 as long as the brush 19 or toward a thresher shorter than the brush.

For the purposes of this specification, the brush 19 will be referred to as the accelerator brush. In Figure 1 and in Figure 2 it is illustrated and shown in its normal parallel relation to the reel 27, the spiral conveyor 3 and the threshing cylinder 9. The direction of rotation of the brush 19, the reel 27, the conveyor 3 and the thresher cylinder 9 are indicated by arrows in the drawing.

The top parts of the reel 27, the conveyor 3, the brush 19 and the thresher cylinder 9, travel toward the front of the harvester as indicated by the arrows. The top section of the raddle 37 travels and conveys toward the rear of the harvester. The raddle operates within the transport housing 36.

Power for driving the operative parts of my harvester unit is obtained from a suitable motor (not shown). Power is transmitted from the motor by the cylinder drive belt 18 to the cylinder pulley Figure 1—17 which is fixed on the cylinder shaft Figure 2—15. The conveyor drive pulley 7 fixed to the thresher cylinder shaft Figure 2—15 carries the conveyor drive belt 7' to drive the conveyor pulley 6 fixed to the conveyor shaft 4 to rotate the spiral conveyor 3. The accelerator brush drive sprocket 24 is fixed to the conveyor drive shaft 4 and carries the brush drive chain 25 to operate the accelerator sprocket 23 fixed to the brush shaft 21 carrying the accelerator brush 19.

The accelerator sprocket 23 and the accelerator brush drive sprocket 24 have an equal number of sprocket teeth and power from the conveyor shaft 4 transmitted over the drive sprocket 24 to the sprocket 23 by the chain 25 causes the accelerator brush 19 to rotate at the same speed and in the same direction as the spiral conveyor 3.

Indicator point 23' on sprocket 23 and point 24' on drive sprocket 24 are used so the drive chain 25 may be placed on the sprockets 23 and 24 so that they will continue to maintain the conveyor 3 and the brush 19 in a permanent operative relation to enable the conveyor coils 8 to follow continuously in the same path through the fibers 26 of the brush 19 and the brush fibers 26 to contact the coils 8 of the spiral conveyor 3 at the same place on each rotation of the brush 19 and the conveyor 3.

The reel drive pulley 21' is fixed to the accelerator brush shaft 21 and carries a belt 31 to transmit power to the reel pulley 30 to rotate the harvester reel 27. The reciprocating sickle 1 is operated by a conventional sickle drive (not shown).

The crop transport raddle shaft 39 is carried in suitable bearings 40 fixed in the sides of the transport housing 36.

Figure 2:
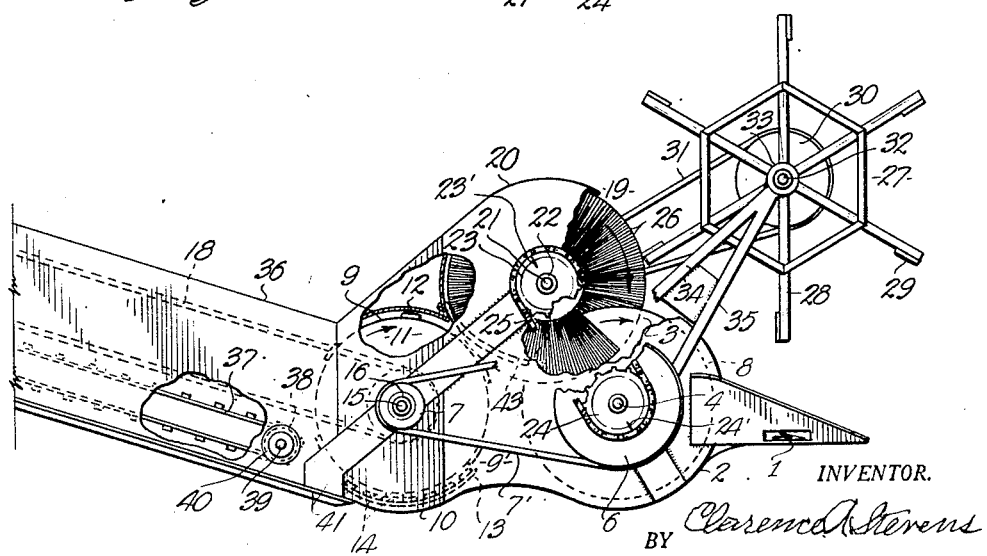
Figure 2 is an end elevation of the harvester unit.

The cylinder shaft Figure 2—15, the spiral conveyor shaft 4 and the crop accelerator brush shaft 21 are all carried in suitable anti-friction bearings fixed on the main harvester frame Figure 2—41. In Figure 2—16 indicates a thresher cylinder shaft bearing. In Figure 1—5 indicates a spiral conveyor shaft bearing. In Figures 1 and 2, the accelerator brush shaft 21 is carried in bearing 22. The reel shaft Figure 2—32 is carried on the reel shaft bearing 33 which is fixed to the reel support frame 34.

The spiral conveyor used in many harvesters to convey the cut crop from the sickle to be transported toward the thresher cylinder for threshing, are of two principal types. In some harvesters, a continuous spiral is arranged to transport the cut crop toward one end of the harvester grain pan. Some of these one-way conveyors deliver the grain directly to the thresher. Other one-way conveyors deliver the cut crop to a transport raddle or to other conveying means for transporting the crop to a thresher cylinder not immediately behind the spiral conveyor.

The second type conveyor employs spirals arranged to convey the crop from the ends of the harvester grain pan toward the transverse center of the grain pan and back in the direction of the thresher cylinder. Figure 1 illustrates a harvester conveyor 3 in combination with a rotatable cylindrical brush 19 to convey material from the ends of the grain pan 2, toward the transverse center of the pan and back toward the thresher cylinder 9.

Conventional types of harvesters employ a reel, to cause the crop to contact the sickle for cutting and to deliver the crop to the spiral conveyor in the harvester grain pan. In some harvesters, no reel is used. The drawings shown in Figures 1 and 2 disclose a harvester having a harvester grain pan 2, a rotatable cylindrical accelerator brush 19, over and in intermeshing relation with a spiral conveyor 3 in contacting relation with a reel 27 at the front and in contacting relation with a thresher cylinder 9 at the rear arranged to convey the crop cut by the sickle 1 from the ends of the grain pan and back toward the thresher cylinder 9.

The accelerator 19 is a cylindrical brush as long as the conveyor 3 and substantially the same diameter. The tough fibers 26 of the brush 19 are slightly longer than the spirals 8 of the harvester conveyor 3 are wide. The fibers of the brush are permanently fixed in the accelerator shaft.

The reel 27, the spiral conveyor 3, the accelerator brush 19, and the thresher cylinder 9, all rotate in the same direction; the tips of the reel arms 28 and the reel bats 29 are in contact with the tips of the brush 19, fibers 26. The fibers 26 of the brush 19 may also contact the cylinder bars 12.

The fibers 26 of the accelerator brush 19 intermesh with the coils 8 of the spiral conveyor 3. The brush fibers may extend into the conveyor coils substantially to the conveyor shaft 4. And, the conveyor coils may extend into the brush 19 nearly to the brush shaft 21 to which the fibers 26 are fixed.

When the harvester is in operation, the reel 27 brings the crop in contact with the sickle 1 which severs the crop and the reel bats 29 deliver the crop into the harvester pan 2. The spiral conveyor 3 contacts the cut crop and transports it toward the thresher cylinder 9. The accelerator brush 19 cooperates with the spiral conveyor 3 to deliver the crop toward the thresher 9.

The combination of the brush 19 and the conveyor 3, in cooperative intermeshing relation produces two useful passages for transport of the crop through the upper and the lower coils 8 of the conveyor 3. The brush 19 in combination with the conveyor 3 constitute a dual means to transport the crop from the sickle 1 toward the thresher, through dual passages in the upper and lower sections of the conveyor. The fibers 26 of the accelerator brush 19 sweeping back through the upper coils of the conveyor 3, transport the crop toward the thresher 9 while the top conveyor 3, coils 8, travel from the thresher 9. The lower coils 8, of the conveyor 3, rotate toward the thresher 9 and transport the crop toward the thresher 9.

The accelerator brush 19 and the spiral conveyor 3, occupy the space extending between the bottom of the harvester grain pan 2 and the hood 20 over the accelerator brush 19. The brush 19, the conveyor 3, the grain pan 2 and the thresher cylinder 9, enclose a long narrow thresher chamber 9' extending between the ends of the grain pan 2. Space between the coils 8 of the conveyor 3 in the under section of the conveyor serve as a passage through which the conveyor transports the crop from the sickle 1 and toward the thresher 9. The cut material entering the thresher chamber 9' passes from the chamber 9' through the space between the thresher 9 and the thresher concave 14 where the grain is beaten from the heads by conventional means. The space between the thresher 9 and the concave 14 is the only exit from the thresher chamber 9' as the top of the thresher chamber is closed by rotatable accelerator brush 19 having fibers 26 intermeshing with the spiral conveyor 3, coils 8.

The thresher 9 beats the grain from the heads and delivers the threshed crop to the raddle 37 to be transported to conventional separating and cleaning means (not shown).

The hood 20 extending over the top of the brush forms a close-fitting semi-cylindrical housing over the accelerator brush. Fixed on the lower back edge of the accelerator brush 19, hood 20, a comb of curved fingers 43 extend through the lower section of the brush 19 to the exterior curves of the spiral coils 8, of the conveyor 3, to prevent material from entering the brush 19.

The accelerator brush 19, as specified and shown in Figures 1 and 2 operating in conjunction with the spiral conveyor 3, provides positive means for transporting the cut crop from the sickle 1 into the thresher chamber and toward the thresher 9.

The accelerator brush 19, in intermeshing relation with the spiral conveyor 3 and in parallel contacting relation with the reel 27, regulates the flow of the crop and brings it under active control from the first contact of the crop by the reel 27, the the delivery of the crop to the thresher cylinder 9.

Any part of the cut crop which might be delivered by the reel on the top of the spiral conveyor 3 is immediately contacted by the fibers 26 of the accelerator brush 19 and swept through the top coils of the spiral conveyor 3 to the thresher chamber 9' and toward the thresher 9.

The accelerator brush 19 and the spiral conveyor 3 cooperate to form a one-way passage beneath the conveyor 3 for the normal transport of the crop toward the thresher 9. The accelerator brush 19 prevents abnormal crop waste caused by parts of the crop being carried around on the reel 27 or thrown over the back of the conventional harvester pan by its reel.

The accelerator brush 19 cooperating with the spiral conveyor 3, needs no feeder housing to deliver the crop toward the thresher. The accelerator brush 19 and the spiral conveyor 3, require a reel 27, harvester grain pan 2 and a sickle 1, as long as the conveyor 3.

By eliminating the feeder housing of conventional harvesters and using a sickle as long as the spiral conveyor, a large increase in cutter capacity over conventional machines is secured without any increase in over-all width of the harvesters.

What I have shown in Figures 1 and 2 and specified in the text is indicated as preferred construction. The accelerator brush 19 and the spiral conveyor 3 as specified and shown in Figures 1 and 2 operating in combined relation may deliver a crop from the sickle toward a thresher that is not immediately behind the spiral conveyor or in contact with the fibers of the accelerator brush.

The intermeshing coils 8 of the spiral conveyor 3 and the fibers 26 of the accelerator brush 19, cooperate to deliver the crop in a uniform flow toward the thresher cylinder 9. The accelerator brush 19, fibers 26, intermeshing with the coils 8 of the spiral conveyor 3, rotate in the same direction and occupy the space between the grain pan 2 and the accelerator brush hood 20.

The accelerator brush 19 and the spiral conveyor 3, in intermeshing relation prevent flying grains from the thresher cylinder from escaping through the top coils 8 of the conveyor 3. A portion of the crop is delivered toward the thresher cylinder by the under section of the conveyor 3. The fibers 26 of the accelerator brush 19 continue to sweep material from the upper section of the conveyor 3, coils 8 and to keep the conveyor free from any material which might tend to interrupt the uniform flow of the crop toward the thresher.

The accelerator brush 19 with the fibers 26 extending to the reel 27, sweep material from the reel bats 29 through the conveyor coils 8 toward the thresher 9 and prevent the reel from carrying any of the crop around or throwing any of the crop over the harvester grain pan.

The accelerator brush 19 and the spiral conveyor 3 constitute dual means for transport of the cut crop through the dual passages from the sickle toward the thresher and deliver the crop back through the upper and lower coils of the conveyor. The crop is transported toward the thresher by combined operation of the brush 19 and the conveyor 3.

The present embodiment is to be understood as illustrative rather than restrictive and the invention is not to be taken as limited by the structure disclosed, except as defined in the following claims.

What I now claim as new, and desire to secure by Letters Patent is:

1. In combination with a harvester having a thresher mechanism, a harvester pan in front of the thresher mechanism, a sickle supported along the front of the harvester pan, and a spiral conveyor rotatable in the pan with the lower portion of the flights thereof moving over the pan in a direction to advance a crop cut by the sickle along the pan and toward the thresher mechanism, means for accelerating flow of the crop by the conveyor including a brush, means supporting the brush for movement over the upper portion of the conveyor in the direction of the threshing mechanism to sweep any part of the crop that falls upon the conveyor through the upper portion of said flights and toward the thresher mechanism, and means for operating the brush in timed relation with the conveyor.

2. In combination with a harvester having a threshing mechanism, a harvester pan in front of the threshing mechanism, a sickle supported along the front of the harvester pan, and a spiral conveyor rotatable in the pan with the lower portion of the flights thereof moving over the pan in a direction to advance a crop cut by the sickle along the pan and toward the thresher mechanism, means for accelerating flow of the crop by the conveyor including a brush having a plurality of flexible elements, means rotatably supporting the brush over the upper portion of the conveyor with portions of the flexible elements movable between the upper portion of the flights of the conveyor and in the direction of the thresher mechanism to sweep any part of the crop that tends to fall upon the conveyor through said upper portion of the flights and toward the thresher mechanism, and means for operating the brush in timed relation with the conveyor whereby the flights of said conveyor follow the same path between the flexible elements of the brush at each successive rotation of the brush.

3. In combination with a harvester having a threshing mechanism, a harvester pan in front of the threshing mechanism, a sickle supported along the front of the harvester pan, a reel supported over the sickle and arranged to move a crop into contact with the sickle and to direct the crop into the harvester pan, a spiral conveyor rotatable in the pan with the lower flights thereof moving over the pan in a direction to advance the cut crop along the pan and toward the thresher mechanism, means for accelerating flow of the crop by the conveyor including a brush, means for supporting the brush for movement over the upper portion of the conveyor in the direction of the threshing mechanism to sweep any part of the crop that falls upon the conveyor through the upper portion of the flights and toward the thresher mechanism, said brush being in contact with the reel for assuring removal of the cut crop from the reel, and means for rotating the reel, conveyor and brush including means for operating the brush in timed relation with the conveyor.

4. In combination with a harvester having a thresher mechanism, a harvester pan in front of the thresher mechanism, a sickle supported along the front of the harvester pan and a spiral conveyor rotatable in the pan with the lower portion of the flights thereof moving over the pan in a direction to advance a crop cut by the sickle along the pan and toward the thresher mechanism, means for accelerating flow of the crop by the conveyor including a brush, means supporting the brush for movement over the upper portion of the conveyor in the direction of the thresher mechanism to sweep any part of the crop that falls upon the conveyor through the upper portion of said flights and toward the thresher mechanism, and a housing covering the upper portion of the brush, said brush and conveyor cooperating with the harvester pan to form a passageway to the thresher mechanism.

5. In combination with a harvester having a thresher mechanism, a harvester pan in front of the thresher mechanism, a sickle supported along the front of the harvester pan and a spiral conveyor rotatable in the pan with the lower portion of the flights thereof moving over the pan in a direction to advance a crop cut by the sickle along the pan and toward the thresher mechanism, means for accelerating flow of the crop by the conveyor including a brush, means supporting the brush for movement over the upper portion of the conveyor in the direction of the thresher mechanism to sweep any part of the crop that falls upon the conveyor through the upper portion of said flights and toward the thresher mechanism, a housing covering the upper portion of the brush, said brush and conveyor cooperating with the harvester pan to form a passageway to the thresher mechanism, and a comb contacting the brush to assure discharge of the crop from the brush into said passageway.

6. In a harvester, a harvester pan, a sickle supported along the front of the harvester pan, a brush housing over the side of the pan opposite the sickle, a spiral conveyor rotatable in the pan with the lower portion of the flights thereof moving over the pan in a direction to advance a crop cut by the sickle along the pan and into a threshing chamber in the pan, a brush, means supporting the brush in said housing for movement over the upper portion of the conveyor in the direction of the threshing chamber to sweep any part of the crop that falls upon the conveyor through the upper portion of said flights and into the threshing chamber, and means for operating the brush in timed relation with the conveyor.

7. In combination with a harvester having a threshing mechanism, a harvester pan in front of the threshing mechanism, a sickle supported along the front of the harvester pan and a spiral conveyor rotatable in the pan with the lower portion of the flights thereof moving over the pan in a direction to advance a crop cut by the sickle along the pan and toward the thresher mechanism, means for accelerating flow of the crop by the conveyor including a brush, means supporting the brush in contiguous relation with the upper portion of the conveyor to sweep any part of the crop that falls upon the conveyor through said upper portion of the flights and toward the thresher mechanism, and means for operating the brush in timed relation with the conveyor.

8. In a harvester, a harvester pan, a sickle supported along the front of the harvester pan, a housing cooperating with the pan, a threshing cylinder at the rear of the pan, a spiral conveyor rotatable in the pan with the lower portion of the flights thereof moving over the pan in a direction to advance a crop toward the threshing cylinder, said conveyor cooperating with the threshing cylinder and harvester pan to provide a crop receiving chamber at the front of the threshing cylinder, a brush, means supporting the brush in said housing for movement over the upper portion of the conveyor in the direction of the threshing cylinder to sweep any part of the crop that falls upon the conveyor through the upper portion of said flights and into the receiving chamber, a comb supported in the housing and contacting the brush to clean the brush of the cut crop, and means for operating the brush in timed relation with the conveyor.

9. In a harvester, a harvester pan, a sickle supported along the front of the harvester pan, a housing supported over the pan, a threshing cylinder at the rear of the pan, a spiral conveyor rotatable in the pan with the lower portion of the flights thereof moving over the pan in a direction to advance a crop toward the threshing cylinder, a brush cooperating with the cylinder, pan and conveyor to provide a crop receiving chamber at the front of the thresher cylinder, means supporting the brush in said housing for movement over the upper portion of the conveyor in the direction of the threshing cylinder to sweep any part of the crop that falls upon the conveyor through the upper portion of said flights and into the receiving chamber, and means for operating the brush in timed relation with the conveyor.

10. In a harvester, a harvester pan, a sickle supported along the front of the harvester pan, a threshing cylinder at the rear of the pan, a spiral conveyor rotatable in the pan with the lower portion of the flights thereof moving over the pan in a direction to advance a crop cut by the sickle along the pan and toward the threshing cylinder, a brush, means supporting the brush in contiguous relation with the conveyor and the threshing cylinder to cooperate with the conveyor for delivering the cut material to the cylinder, and driving means for rotating the cylinder, conveyor and brush in the same directions.

11. A harvester unit including a main frame, a harvester pan carried by the main frame, a reel carrying frame on the main frame, a reel rotatable on the carrying frame, a reciprocative sickle on the front of the pan, a rotatable spiral conveyor in the harvester pan behind the sickle, a rotatable thresher cylinder at the rear of the conveyor and in an opening in the back of the harvester pan, a rotatable cylindrical brush above the conveyor having fibers extending between the coils of the spiral conveyor and forward to contact with the reel and rearward to substantially contact with the thresher cylinder, a semi-cylindrical housing extending from a union with the back of a harvester pan and over the brush to near contact with the reel, fingers fixed to the housing and extending forward to near contact with the spiral conveyor, and means for rotating all of said rotatable elements in the same direction with under portions of the brush and spiral conveyor moving from the direction of the sickle toward the thresher cylinder to convey a crop cut by the sickle to the cylinder.

12. A harvester unit including a main frame, a harvester pan carried by the main frame, a reel carrying frame on the main frame at the front of the harvester pan, a reel rotatable on the reel carrying frame, a reciprocative sickle on the front of the pan, a rotatable spiral conveyor in the harvester pan behind the sickle, a rotatable thresher cylinder at the rear of the conveyor and in an opening in the back of the harvester pan, a rotatable cylindrical brush above the conveyor and having fibers extending between the upper portion of the coils of the spiral conveyor, said fibers also extending forward to contact with the reel and rearward to substantially contact with the thresher cylinder, a semi-cylindrical housing extending from a union with the back of a harvester pan and over the brush to near contact with the reel, means in the housing extending to near contact with the spiral conveyor for preventing accumulation of material on said brush, and means for rotating all of said rotatable elements in the same direction with under portions of the brush and spiral conveyor moving from the direction of the sickle toward the thresher cylinder to convey a crop cut by the sickle to the cylinder, said accelerator brush and spiral conveyor being operated at the same peripherial speed.

CLARENCE A. STEVENS.